United States Patent
Bailis et al.

[11] Patent Number: 6,144,731
[45] Date of Patent: Nov. 7, 2000

[54] DISTRIBUTED TELEPHONY MANAGEMENT

[75] Inventors: Jason Bailis; Karen Bell, both of Navato; Terry Svetz, Kenwood; Allen Jackson, Penngrove; Bob Kaplan, Kensington, all of Calif.

[73] Assignee: Harris Corporation, Melbourne, Fla.

[21] Appl. No.: 08/814,922

[22] Filed: Mar. 12, 1997

[51] Int. Cl.⁷ .................................................. H04M 7/00
[52] U.S. Cl. ........................................... 379/229; 379/268
[58] Field of Search .................................. 379/229, 230, 379/207, 268

[56] References Cited

U.S. PATENT DOCUMENTS

| | | |
|---|---|---|
| 1,322,025 | 11/1919 | Keith ........................................ 379/268 |
| 3,525,817 | 8/1970 | Richards . |
| 4,210,782 | 7/1980 | Fujita . |
| 4,256,926 | 3/1981 | Pitroda et al. . |
| 4,565,903 | 1/1986 | Riley . |
| 4,614,841 | 9/1986 | Babecki et al. . |
| 4,747,130 | 5/1988 | Ho . |
| 5,212,788 | 5/1993 | Lomet et al. . |
| 5,329,579 | 7/1994 | Brunson . |
| 5,335,343 | 8/1994 | Lampson et al. . |
| 5,343,194 | 8/1994 | Bowdon ............................ 379/221 X |
| 5,379,280 | 1/1995 | Cotton et al. . |
| 5,394,463 | 2/1995 | Fischell et al. . |
| 5,428,679 | 6/1995 | French . |
| 5,452,350 | 9/1995 | Reynolds et al. . |
| 5,452,445 | 9/1995 | Hallmark et al. . |
| 5,452,450 | 9/1995 | Delory . |
| 5,454,034 | 9/1995 | Martin ................................ 379/220 X |
| 5,473,679 | 12/1995 | La Porta et al. . |
| 5,473,680 | 12/1995 | Porter . |
| 5,481,604 | 1/1996 | Minot ..................................... 379/221 |
| 5,499,290 | 3/1996 | Koster ................................ 379/201 X |
| 5,517,562 | 5/1996 | McConnell ......................... 379/268 X |
| 5,533,116 | 7/1996 | Vestrerinen . |
| 5,602,991 | 2/1997 | Berteau . |
| 5,717,748 | 2/1998 | Sneed, Sr. et al. . |
| 5,732,130 | 3/1998 | Iapalucci et al. . |
| 5,761,292 | 6/1998 | Wagner et al. ......................... 379/229 |
| 5,864,614 | 1/1999 | Farris et al. . |
| 5,892,822 | 4/1999 | Gottlieb et al. . |
| 5,940,490 | 8/1999 | Foster et al. ........................ 379/230 X |

FOREIGN PATENT DOCUMENTS

| | | |
|---|---|---|
| 0 675 451 | 10/1995 | European Pat. Off. . |
| 97/05703 | 2/1997 | WIPO . |

*Primary Examiner*—Creighton Smith
*Attorney, Agent, or Firm*—Rogers & Killeen

[57] ABSTRACT

Apparatus and method for achieving distributed telephony management within a network of telecommunication switches are disclosed. By using techniques known to computer communication technology but as yet unapplied to telephony, execution of tasks necessary for the proper functioning of a telephony network are performed with increased efficiency, ease, and throughput by distributing processing amongst the switches composing the network and attached computers.

12 Claims, 3 Drawing Sheets

DISTRIBUTED TELEPHONY MANAGEMENT

BACKGROUND OF THE INVENTION

The present invention relates to the use of distributed management in a telephony system. Distributed management can provide a significant improvement in system performance and resource utilization. The underlying technology disclosed herein has been used in certain computing applications, but has not yet been used in the telephony arena.

One universal feature of telephone switching equipment is the requirement that it be able to manipulate enormous quantities of data. This data comes in the form of user identification, user privileges, telephone extensions, trunks to other switches, and many others.

Another feature common to all telephone switches, and arguably even more critical, is the inherently real-time nature of the data manipulation that such switches must perform. Even a slight delay in the routing of a call is perceived by users of a telecommunication system as a problem. In large part, this requirement has defined the evolution of telephone switching equipment and telephone network architectures.

With this background, data manipulation has generally been performed by switching equipment in a proprietary and highly integrated manner. Local switching systems tend to be custom designed in order to meet local performance requirements. While meeting local needs, this raises problems at the interfaces between switching systems.

One negative result that grew out of this situation was redundancy between services performed by interacting switching systems. Basic services would be performed repeatedly as data passed from one switching system to the next, lowering overall performance of data transport. An additional problem lies in the necessity of ensuring that each switching system was capable of interfacing with each other system with which it exchanged data. Further, integration of these switching systems with non-telephony equipment was limited. A lack of common interface standards meant that telephony systems were limited in their performance, maintainability, and usability.

The present invention provides both methods and apparatus of improving upon the current state of telephone switching using the concept of distributed management. By drawing upon techniques and architectures used in the computer industry but not yet applied to telephony systems, throughput and response time can be significantly improved.

Accordingly, it is an object of the present invention to provide a novel method of routing non-call related applications across a switch interface wherein the transport method is transparent to the communicating switches involved.

It is another object of the present invention to provide a novel telecommunication system in which signaling channels are used for data exchange.

It is yet another object of the present invention to provide a novel method of synchronizing the state of data which needs to be updated and which is maintained at multiple telecommunication devices such that the required changes are made at all such devices or at none.

It is still another object of the present invention to provide a novel telecommunications network wherein processes and applications are distributed amongst a number of hardware locations.

It is a further object of the present invention to provide a novel method and apparatus of allowing a computer to interact with a telephone switch through the use of a local area network.

It is a further object of the present invention to provide a novel command structure for use in a telecommunication system which allows a querying switch to receive requested notification without the queried switches having to maintain addressing information of the querying switch.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
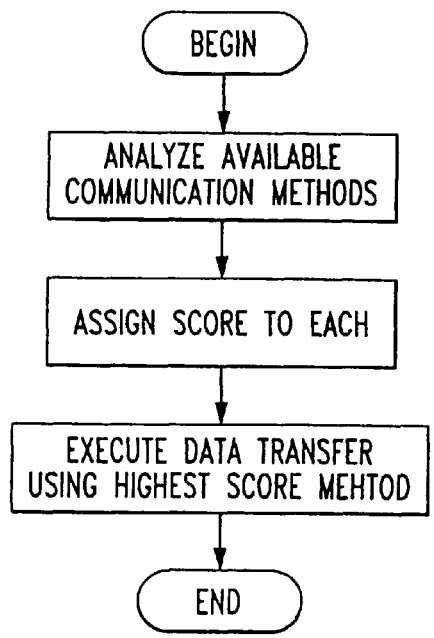
FIG. 1 is a flow chart showing the sequence of steps performed in transparently establishing a transport method between switches.

With reference to FIG. 1, an embodiment of the present invention may include a method of inter-switch signaling addressing non-call related applications in a telecommunication system. Signaling involves an exchange of data required to establish, manage, and tear down a telephone call. This signaling may be performed in a manner that is transparent to the communicating applications.

The communicating applications see a generic interface which hides the selection of the particular transport method which establishes the communication between the applications. This selection and transport method establishment may be handled by a process executed by the telecommunication switches. The determination of which transport method to use may be based on any of a number of criteria, which may include, but is not limited to, cost and load.

Figure 2:
FIG. 2 is a representation of a pair of telecommunication switches connected by a bidirectional data path and bidirectional signaling channel, with a computer connected to each switch.

Another embodiment of the present invention involves the use of a signaling channel between switches for communication between non-switch applications or end users. As shown in FIG. 2, telecommunication switches communicate through both a data and a control-type signaling channel. The data path, or B channel, is the primary vehicle for data transmission. The signaling channel, or D channel, is used for other, non-data communication. As data rates have increased the signaling channel may be used as a communication path between non-switch applications or end users connected directly to a telecommunication switch.

Figure 3:
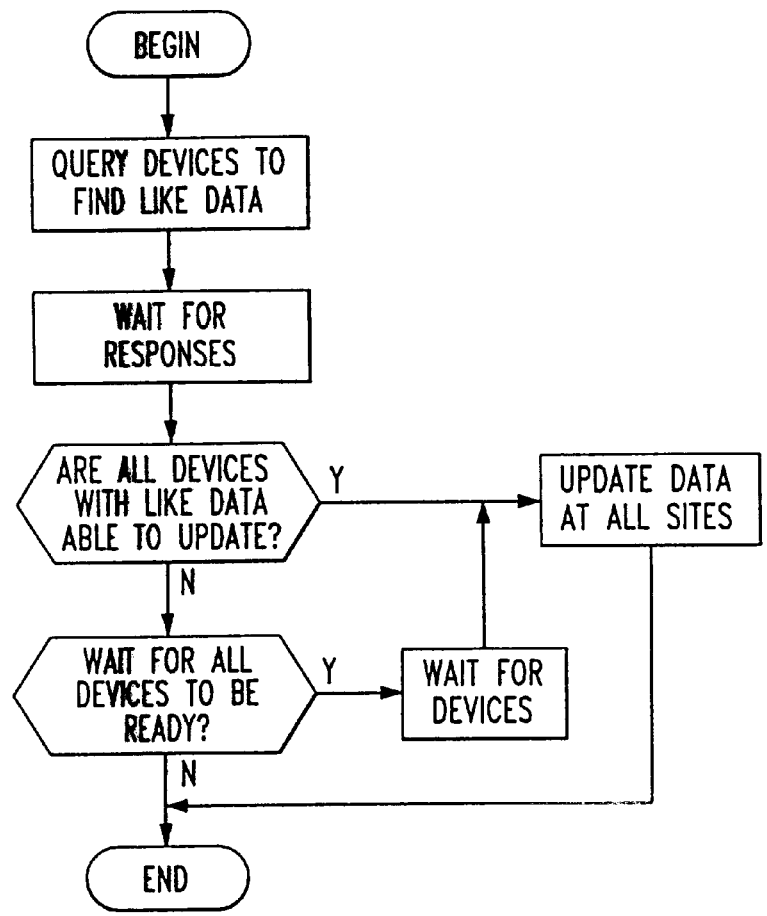
FIG. 3 is a flow chart showing the steps involved in updating information at multiple telecommunication switches.

Yet another embodiment of the present invention involves the use of a "two phase commit" data update protocol between telecommunication switches, as shown in FIG. 3. A two phase commit protocol involves a requirement that all locations where particular data is stored are updated or none are updated. This is used in areas where copies of data are maintained in multiple locations and the data must be kept consistent. This may be implemented in a telecommunication context with respect to information such as subscriber data, etc.

In such a use, a process which seeks to modify data which is stored in multiple locations in a telecommunication system may issue a query to determine all such locations for the data in question. The querying process waits for a response and then queries to determine if all such locations are capable of updating their data. If one or more of these locations cannot update the data, none of the locations update. Only if all locations are capable of updating the data is the data updated at all locations. This may be implemented more easily if the data is managed at the telecommunication switches by relational databases, which may have such a feature built in.

Figure 4:
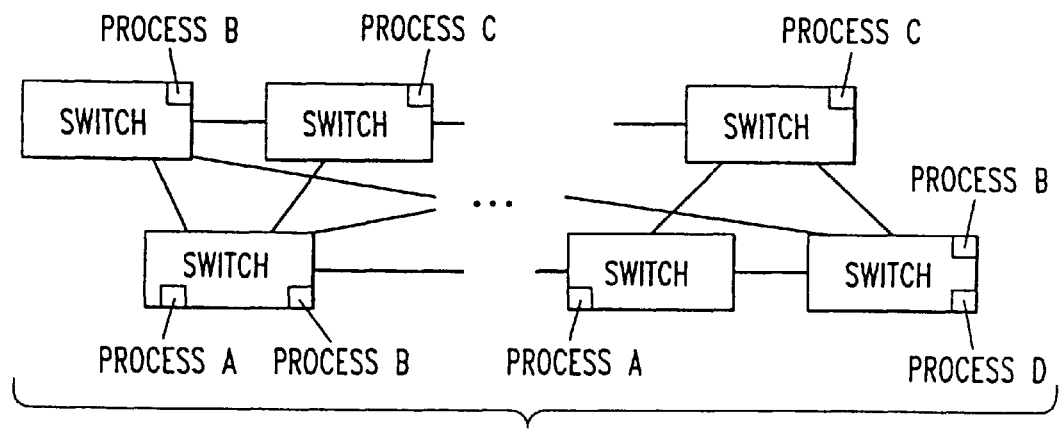
FIG. 4 is a representation of a telecommunication network and distributed processes contained therein.

A further embodiment of this invention involves distribution of processes and applications across a telecommunication network. As seen in FIG. 4, telecommunication processes may reside in multiple telecommunication switches. A particular switch may include, and be capable of executing, more than one process and a process may reside in more than one telecommunication switch.

Figure 5:
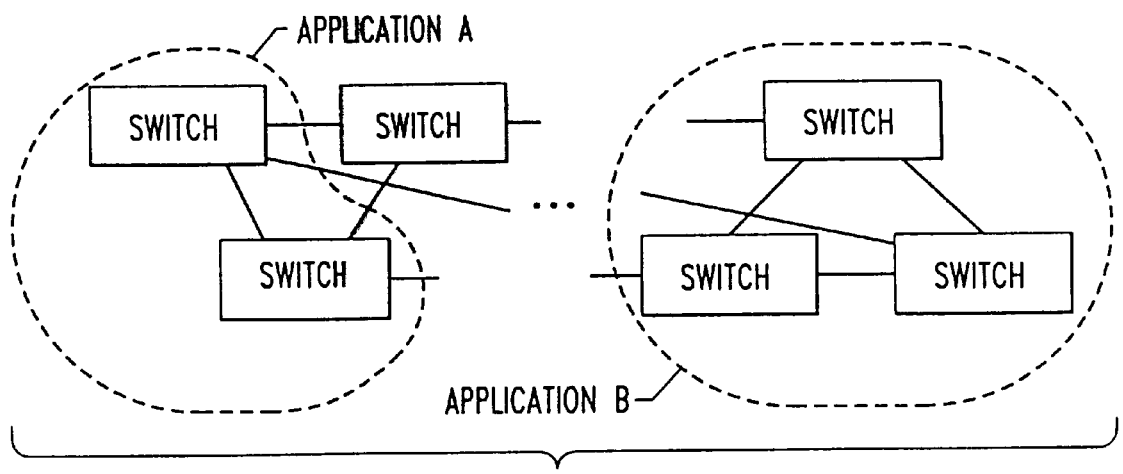
FIG. 5 is a representation of a telecommunication network and distributed applications contained therein.

An additional embodiment related to the previous embodiment is shown in FIG. 5. In this embodiment, an application which is executed by telecommunication switches is split amongst more than one switch. Through such an arrangement, resources such as processing time and memory usage can be distributed amongst the respective switches. In addition, data maintained at a particular telecommunication switch is readily available and results may be efficiently shared on the telecommunication network. From the perspective of an end user, the distributed nature of the application may be transparent.

A distributed application such as this may perform tasks such as multi-node conference management. In such an embodiment, the application would be performed by all switches involved in the conferences. Working as a unit, the switches may gather information related to the conference members, status of the call, and other pertinent data in a manner much more efficient than if centrally controlled.

Figure 6:
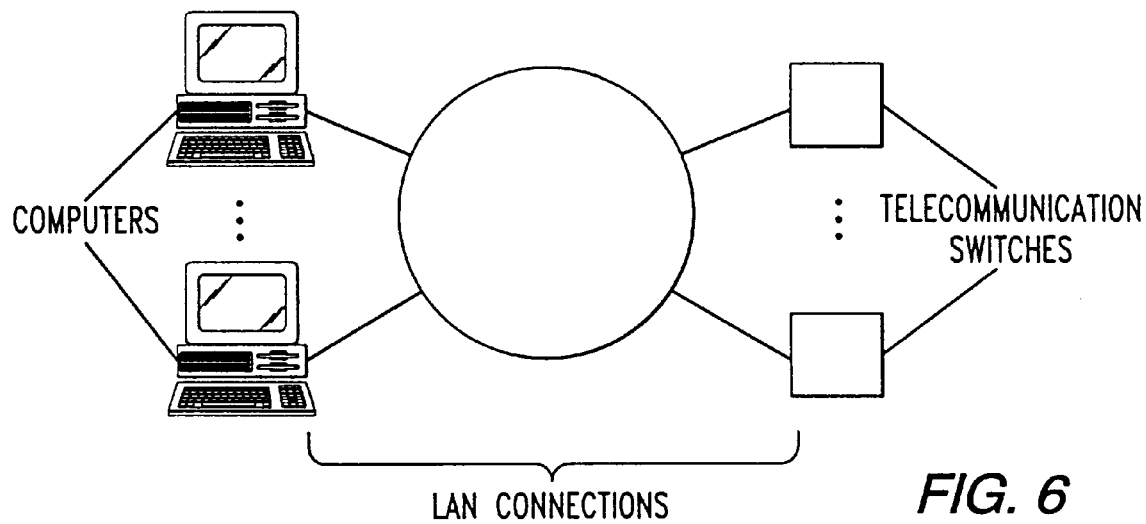
FIG. 6 is a representation of computers connected to telecommunication switches via a local area network (LAN).

Another embodiment of this invention involves the use of a local area network (LAN) to control and monitor a telecommunication switch. Management of a telecommunication network may be distributed through LAN access to individual telecommunication switches, as seen in FIG. 6. Such interaction between one or more computers so connected to one or more telecommunication switches may be used for both control of the operation of a switch and reporting by the switch.

In one such case, a system administrator may use a computer connected via LAN to configure the switch, such as editing phone extensions and user permissions. In a reporting capacity, a proxy agent may be connected via a LAN to a telecommunication switch. Such communication may be executed through Simple Network Management Protocol (SNMP), a protocol generally not used with telecommunication equipment.

Figure 7:
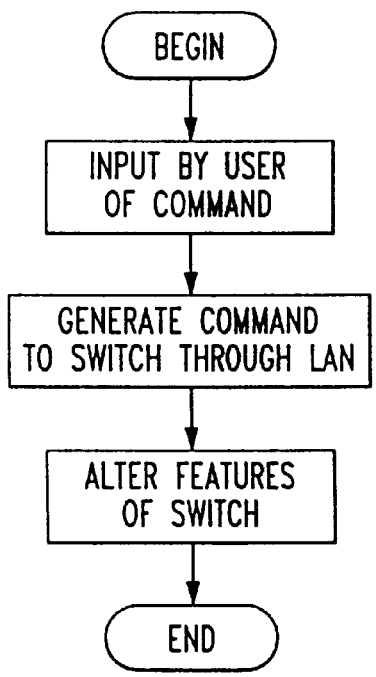
FIG. 7 is a flow chart showing the steps performed in controlling a feature of a telecommunication switch through a computer connected by a LAN.
Figure 8:
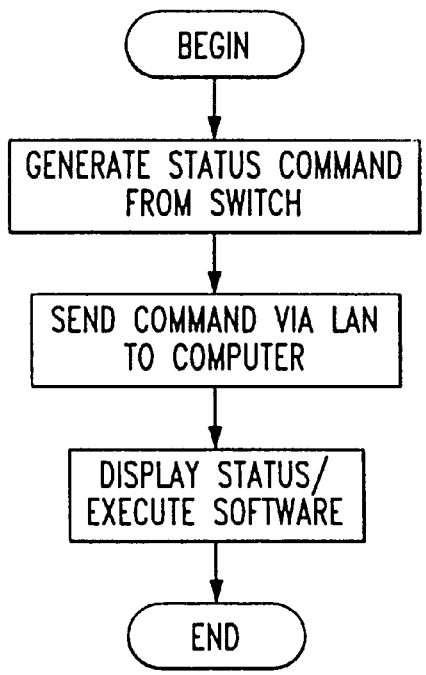
FIG. 8 is a flow chart showing the steps performed in a telecommunication informing a computer of status via a LAN.

FIGS. 7 and 8 show the sequence of steps which may be performed by the user, in the case of switch management, and the switch, in the case of alarm reporting. In the case of switch management by the user, the user issues a command through the computer, the computer converts the command according to the LAN protocol being used and sends it to the telecommunication switch, and the switch executes the command and performs the alteration as commanded. In the case of alarm reporting by the telecommunication switch, the telecommunication switch generates the status, converts it according to the LAN protocol being used and sends it to the attached computer, which displays the information to the user or performs some action in response.

Figure 9:
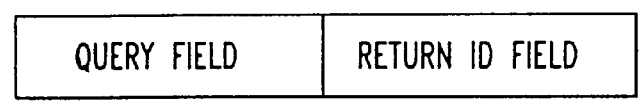
FIG. 9 is a diagram of a query command used between telecommunication switches and the fields contained therein.

An additional embodiment of the present invention involves a query command which facilitates distributed management amongst telecommunication switches. A command with the fields shown in FIG. 9 may be executed by a process in a telecommunication switch to request notification from one or more other switches upon certain events occurring. With such a command, it is not necessary for the requesting switch or the queried switches to maintain the return information needed to get the answer back to the querying switch.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of communicating information between non-call related applications in a telecommunication system, said communicating method capable of being performed according to a plurality of transport methods, said communicating method comprising the steps of:
   (a) analyzing the available said transport methods based on one or more criteria;
   (b) assigning a score to each said transport method as a result of said analysis; and
   (c) executing said signaling according to said transport method which received the highest said score
   wherein the communication of information is controlled through use of a local area network connected to the telecommunication switches and to one or more computers, the control comprising the steps of:
   inputting by a user at one of said computers of a command to perform one or more actions upon said telecommunication switch;
   generating a command through said local area network from said one computer to said telecommunication switch based on input from said user; and
   altering one or more features of said telecommunication switch in response to said command from said computer.

2. The method of claim 1 wherein said one or more criteria comprise load on said telecommunication system.

3. The method of claim 1 wherein said one or more criteria comprise the cost of said transport methods.

4. The method of claim 1 including the reporting of one or more features of a telecommunication switch through use of a local area network connected to said switch and one or more computers by the steps of:
   generating a status command by said telecommunication switch;
   generating a command through said local area network from said telecommunication switch to said computer based on said status; and displaying of said status to a user of said computer and/or execution of software on said computer based on said status.

5. The method of claim 1 wherein said one or more criteria comprise load on said telecommunication system.

6. The method of claim 1 wherein said one or more criteria comprise the cost of said transport methods.

7. The method of claim 4 wherein said one or more criteria comprise load on said telecommunication system.

8. The method of claim 4 wherein said one or more criteria comprise the cost of said transport methods.

9. A method of synchronizing the modification of like data stored within two or more telecommunication devices in a telecommunication system, said method comprising the steps of:

(a) initiating a query from one of said telecommunication devices within which said like data is stored to all other said telecommunication devices in which said like data is stored;

(b) waiting for responses from said other telecommunication devices as to whether said like data is in a state in which said like data can be modified; and (c) based on said responses, executing a command to modify said like data at all said other telecommunication devices if all said other telecommunication devices are in a state in which said like data can be modified, or performing no said modifications to said like data if one or more said other telecommunication devices are in a state in which said like data cannot be modified.

10. The method of claim 9 wherein said telecommunication devices are telecommunication switches.

11. The method of claim 10 wherein said telecommunication switches contain relational databases.

12. A telecommunication network, said telecommunication network comprising a plurality of telecommunication switches, a plurality of said telecommunication switches capable of independently executing like telecommunication processes, said telecommunication switches executing said processes for that same or another telecommunication switch wherein a plurality of unlike said telecommunication processes reside together in one or more said telecommunication switches.

* * * * *